Patented Dec. 12, 1922.

1,438,403

UNITED STATES PATENT OFFICE.

WILLY SCHERLER, OF SCHAFFHOUSE, SWITZERLAND.

MICRORECORDING FILM FOR USE IN MEASURING APPARATUS.

No Drawing.  Application filed July 22, 1920. Serial No. 398,290.

*To all whom it may concern:*

Be it known that WILLY SCHERLER, citizen of the Republic of Switzerland, residing at Schaffhouse, Switzerland, has invented a new and useful Microrecording Film for Use in Measuring Apparatus; and he does hereby declare the following to be a full, clear, and exact description of the same.

When measurements are to be made for scientific and industrial objects, it is often required that the indications of the measuring instruments be recorded by self-action, in order that the observer may move away from the apparatus, particularly in the case of continuous measurements, or if the rapid progress of the performance or the difficulty to access of the apparatus does not allow continuous recording by hand. For this reason, a considerable number of instruments of measurment and control have been constructed, which have continually been improved.

As far as known no proceeding for writing has been found, which would be suitable for all sorts of measurements occurring, and it has been necessary to construct special writing-apparatus according to the exigencies.

According to the disposable energy of the system of measurement and the speed of the difference of oscillation, one of the following two chief groups is used:

(1) If the admissible friction of the writing apparatus and the speed of the difference of oscillation are not too important, it is possible to use pencils and pens which are so constructed that the friction during the greater part of the measurement is null, because the writing organ is only from time to time in contact with the surface on which the indications must be made.

(2) But if the important friction of the writing organ influences too much the exactness or if the too quick progress of the process does not allow the use of writing organs, only the photographic proceeding may be taken into consideration. The spark-writing-organs which do not rub may also be taken into consideration, but they do not draw very quickly and regularly because they have a certain mass. The value of a recording proceeding depends in the first place on the exactness of the drawing and on the security of service. Besides, the recording apparatus should be simple and cheap and the curve obtained should give a good statement.

None of the above mentioned proceedings answers to all these exigencies.

The pencils and ink pens generally used for industrial objects have only a limited exactness because the friction is very considerable and the width of the draughts is irregular. In order to reduce the unfavourable influence of the width of the draughts, a corresponding greater oscillation is generally used and consequently a larger recording strip but a transmission is then often indispensable. It therefore results that the mass to be moved is increased and the friction is greater.

In order to overcome the resistance of the friction and of the mass, strong and consequently heavy systems of measurement must be used. The sure advance of the recording strip must consequently be secured by heavy driving gears. But a greater disadvantage of this proceeding of recording is the great consumption of paper and ink, or pencil, so that when the recording must be continuously performed, the time must be very short. For instance an ordinary recording-wattmeter with a corresponding advance of the recording strip of two centimeters in an hour consumes in a year $2 \times 8760 = 17520$ centimeters $= 175.2$ meters of recording paper. It is not possible at one time to put such a large quantity of paper into the apparatus and the statement would be inconvenient. For this reason the length of the recording strip put into the apparatus at a time does not exceed 40 meters, corresponding to a recording-time of about 3 months. But the possibility of failure of the writing-organs must also be taken into consideration and the time of recording must therefore be still more reduced, so that practically the time of recording may not exceed one month.

The disadvantage of the friction of the writing organs is reduced in the instruments which only write intermittently. On the other hand, they are only appropriate for recording slowly variable processes and they have therefore a limited field of application.

For this reason the spark-writing-apparatus are of better use but they have the disadvantage that the indispensable electric source of current and the field-magnets do not present the necessary security of service and they are only appropriate for a short working time; in addition to this, the burns which constitute the curves render the statement inconvenient or the recording strips are burnt through from place to place, according as the writing organ varies its position or remains steady.

The only photographic process which might be used for a rapid recording is constituted by curves with proportionally large and irregular widths. In spite of their working without friction, these apparatus do not give exact results. The complexity of their manipulation and their high price have allowed their introduction into industry only in isolated cases.

On consideration of the disadvantages in the above-mentioned apparatus, it may be stated that in order to have exact indications furnished by self-acting writing-apparatus, it is necessary to obtain regular and small curves, a little mass of the moved pieces and the least friction possible.

One of the first known recording apparatus partly corresponds to these exigencies: it is the soot-writing-apparatus.

Indeed this instrument provided with corresponding soot gives rather small and regular curves so that the oscillations may be limited and consequently the width of recording, thus allowing the movable system to be constructed with a little mass and to work with little friction. But as the layer of soot does not adhere firmly to the recording plate, the curves must not be too near and the reduction of the recording surface is therefore limited. The chief disadvantage of this process, which may be used not only in a laboratorium, is the unsteadiness and the delicacy of the layer of soot, so that the good recording and the preserving of the curves are not possible and the manipulation is not at all easy.

All above mentioned disadvantages are avoided with the following proceeding of microrecording.

According to the preceding object of the invention, a hard pencil with a fine point, for instance a diamond fragment or an iridium point scratches the curve in a lightly transparent very thin layer which is proportionally applied on the recording strip so as to firmly adhere to it, the recording strip being also insensible to eventual influences of light, temperature and humidity. The strips may consist of a layer of silver on glass or a film-band. The draughts may be scratched as near as the visibility allows, that is to say, till the utmost limit of the visibility under the microscope. This limit may be measured and corresponds to the power of the microscope, which is obtained from the distance $\epsilon$ perceptible between two parallel draughts with traversing light, and gives $$\epsilon \geq \frac{\lambda}{a},$$

where $\lambda$ represents the wave length of the used light in air and $a$ the numerical aperture of the objective used.

For a moderately strong miscroscope that may be used for technical measurements, $\epsilon = 0.001$ mm. In consequence of the contrast between the scratched draught and the intact layer, the process of the diagram may be seen with the naked eye by appropriate lighting even if the draughts are very thin. It is, therefore, very valuable because on examining such diagrams, it is always more interesting to know first the complete process, the details being only examined afterwards if so desired. With the present proceeding, the particularities may be set off with the desired sharpness by corresponding enlargement. This process may not be pursued with the known proceeding because in order to be visible the particularities must be drawn from the beginning on a large scale corresponding to the width of the draught, from which the whole view would be rendered difficult and in this case an enlargement in order to examine the particularities would offer no further advantages.

Thanks to the considerably reduced width of the draught, the oscillation and the advance, that is to say, the necessary surface of the diaphragm, may be reduced as far as the possibility of distinguishing the details allows.

The present proceeding works for instance with draught-widths of a few hundredths of a millimetre. The width of the draught of a pen is, on the average, some tenths of a millimetre. For instance, when the width of 0.002 mm. obtained with the present proceeding and the width of 0.2 mm. obtained with a pen are compared, the surface of the diagram is reduced $100 \times 100 = 10,000$ times in the favour of the micro-writing-apparatus. The above mentioned example concerning a recording-wattmeter gives in a year a diaphragm strip of 175.2 m. length, and a width of 120 mm., the usable surface of the diagram being thus 21.024 m$^2$. The corresponding micro-diagram has a length of 1.752 m. and a width of 1.2 mm., giving thus a usable surface of 0.0021 m$^2$.

With the micro-proceeding, it is possible to use a new method of writing by which an especially good use of the surface of the diagram is possible. The strip is in this case divided into lines of a certain length; when a line is finished, the pencil is put at the beginning of the next one; this may be done by the moving of the pen, of the diagram strip or of the pen and the diagram strip together. The greatly reduced mass of the organs moved allows the pen to be put at the beginning of the next line so quickly that the loss of any part of the curve is avoided. The pencil may thus be taken away at will from the surface of the diagram.

By the disposition of the lines, the usable width of the diagram surface, in comparison to the width which is not possible to be used, is considerably increased, that is to say, the disposable writing surface may be very well used. The chief advantage of this method of writing lines is that it presents a very good whole view of the curves during a long time and by corresponding choice of the same line at different periods, the comparison of these periods is very easy.

For instance if the diagram of a week is written in a single line, the same hours of the same days of the other weeks are placed exactly under the precedents.

According to the rapidity of the process to be registered, the diagram of a certain duration may be registered on a line, for instance a minute, an hour, a day, a week or a year.

The present proceeding presents the possibility of working during long recording-periods not attained till now, so that a plumbing of the microrecording apparatus is also possible for such cases in which it was not possible to do it till now.

I claim as my invention:

1. A writing surface for registering apparatus comprising a film of a translucent character so that the engraved registrations are visible chiefly through the diffraction of the light.

2. In a microrecording film for use with the self-acting means of oscillations of measuring instruments comprising a transparent plate having a smooth surface and insensible to the influences of light, temperature and humidity and a thin lightly translucent layer arranged on the smooth surface and adhering uniformly thereto and being insensible to the influences of light, temperature and humidity.

In testimony whereof, he has signed his name to this specification in the presence of two subscribing witnesses.

WILLY SCHERLER.

Witnesses:
 EDGAR FAVRE,
 MAX BEYNER.